United States Patent Office 3,232,913
Patented Feb. 1, 1966

3,232,913
PROCESS FOR POLYMERIZATION OF OLEFINS
Robert Van Weynbergh, Forest, Brussels, and Louis Schmitz, Hoeilaert, Belgium, assignors to Solvay & Cie., Societe en commandite, a simple of the Kingdom of Belgium
No Drawing. Filed Dec. 3, 1962, Ser. No. 241,499
Claims priority, application Belgium, Feb. 6, 1962, 489,446, Patent 613,567
2 Claims. (Cl. 260—80.7)

The present invention relates to a process for the polymerization of olefins in the presence of a catalyst comprising an oxygenated compound of chromium and a cocatalyst consisting of one or more organic derivatives of an element of Group III–b of the periodic classification of elements.

According to a known process (see U.S. Patent 2,825,721, 1958), solid high polymers can be manufactured from olefins by using a catalyst prepared by depositing an aqueous solution of chromium trioxide on a support selected from the group consisting of silica, alumina, zirconia, and thoria, then by activating this product by heating at a temperature between 250 and 800° C. in a dry atmosphere for several hours. According to this process, polyolefins of very high molecular weight, that is, with low melt index, can be obtained by lowering the polymerization temperature and, in some cases, decreasing, consequently, the polymerization rate and the capacity of the reactors.

The utilization of certain organometallic cocatalysts in combination with catalysts comprising chromium oxide has already been described. Thus a catalyst prepared from $CrO_3$ deposited on a silica-alumina support, activated at a high temperature and then treated by a trialkylaluminum, has already been used for the manufacture of polyethylene of average density (French Patent 1,242,530). This polyethylene, with relatively high melt index and generally greater than 1, is especially suitable for injection molding.

The present invention has for an object an improved process which permits polyolefins of high density and high molecular weight, i.e., low melt index, to be obtained, while the polymerization is carried out at relatively high temperatures and with high reaction rates. Another object of the invention is the increase of the production capacity of the polymerization reactors by raising the polymerization temperature. Other objects and advantages will become apparent to those skilled in the art on consideration of this disclosure.

According to the invention, the polymerization of olefins is carried out in the presence of a catalyst (as described in U.S. Patent 2,825,721) comprising an oxygenated compound of chromium, at least partially in the hexavalent state at the initial contacting of said olefin with said catalyst, and a cocatalyst consisting of the reaction product between a diolefin and a compound of the formula $MeR_3$ wherein Me is a metal of Group III–b of the periodic table of elements, R represents a monovalent radical chosen from among hydrogen and the monovalent organic radicals (e.g., alkyl and aryl radicals containing up to 8 carbon atoms).

The conjugated diolefins react with the organometallic compounds of metals of Group III–b (i.e., B, Al, Ga, In, and Tl) of the periodic table of elements, furnishing bivalent organic radicals. The products obtained in these reactions, and which are used as cocatalysts according to the invention, correspond to the following general formula:

$$[R''MeR''']_m$$

In this formula, Me represents a metal of Group III–b of the periodic classification of elements, R" is a bivalent hydrocarbon radical, derived from a diolefin, R''' is a monovalent radical chosen from among hydrogen, alkyl and aryl radicals and alkyl MeR" radicals and $m$ is a whole number higher than or equal to 1, e.g., from 1 to 3.

The compound used as cocatalysts according to the present invention contain bivalent hydrocarbon radicals R", whose two valences can be fixed to different metal atoms, thus forming linear, branched or cyclic chains of the type

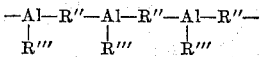

The two valences of these bivalent organic radicals, R", can be fixed to the same metallic atom. The latter is thus engaged in an organometallic heterocycle of the following type

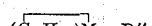

Organometallic heterocyclic compounds of boron are well known, which are obtained by reaction of a boron hydride or a trialkylboron with a conjugated diolefin, particularly 1,3-butadiene. These compounds, which have structures of the type

are shown to be particularly active as cocatalysts in the process according to the invention.

The corresponding organoaluminum derivatives in which aluminum atoms replace the boron atoms can be obtained by reaction between a trialkylaluminum and a diolefin. These products have shown a still greater activity.

The dimension of the organometallic heterocycle has only a little influence on the activity of the cocatalyst. However, heterocycles with 5 or 6 atoms, obtained from diolefins with 4 or 5 carbon atoms, and an organometallic compound of an element of Group III–b of the periodic table are particularly advantageous. If substituted diolefins are used, carbon atoms of the organometallic heterocycle have alkyl or aryl substituents. The activity of the cocatalyst is not diminished. Thus the heterocyclic ring produced contains an alkylene radical with 4 to 5 carbon atoms.

Regarding the third valence bond of the metal atom, it can be saturated by an R''' monovalent radical which can be hydrogen, an alkyl radical, an aryl radical, or an R"Me alkyl radical, that is, an alkyl radical attached to a second metallic atom of the same type as the first.

It has been found that particularly active cocatalysts have two boron or aluminum atoms each engaged in an organometallic heterocycle and connected to each other by a straight or branched alkyl chain, for example compounds of the formula

wherein Me represents a metal of Group III–b of the periodic table of elements and $n$ whole numbers equal to or higher than 3.

A particularly advantageous product in the practice of the present invention is the product sold commercially under the name of "Aluminium Isoprenyl." This product is a viscous yellow liquid whose freezing temperature is −26.3° C.*

---

 The quantitative determination of the elements in this product of which the molecular weight is about 350 yielded the following values: C, 73.3%; H, 12.5%; and Al, 14.3%. The composition of the evolved hydrolysis gas was: isopentane 48% and four carbon hydrocarbons 47%. Treatment with heavy water produced a $C_4$ hydrocarbon containing one deuterium atom and a $C_5$ hydrocarbon containing two deuterium atoms. Infra-red spectral analysis identified no carbon-carbon double bond. Consequently the product contains an equal amount of bivalent saturated $C_5$ radicals and monovalent $C_4$ radicals.

Utilization of the cocatalysts according to the invention permits the manufacture of polymers of very high molecular weight, characterized by a very low melt index, and this while maintaining very high polymerization rates and working at a relatively high temperature.

Maintenance of a high temperature in the polymerization reactors permits an easier evacuation of the heat released during the polymerization and thus a rise in the production capacity of the reactors.

A preferred base catalyst used in the process according to the invention is an oxygenated compound of supported and activated chromium, obtained by impregnation of a support consisting of silica and alumina with a solution of chromium oxide or a compound convertible into chromium oxide by calcination, and activation of this product by heating at a temperature between 250 and 800° C. in a dry atmosphere for several hours, as more fully disclosed in U.S. Patent 2,825,721 (1958).

To this base catalyst is added, according to the invention, a certain amount of cocatalyst consisting of one or more compounds of the formula $$[R''MeR''']_m$$

The amount of cocatalysts varies according to the nature of the metal Me, the polymerization conditions, and the properties of the polymer desired. The atomic ratio Me/Cr in the catalytic composition is usually held at a value between 0.1:1 and 20:1 and preferably between 0.5:1 and 4:1, if Me is aluminum, and between 1:1 and 10:1, if Me is boron.

The catalyst and cocatalyst mixture for obtaining the catalytic composition is made very simply by contacting, under inert atmosphere and in an inert solvent, a suspension of supported and activated chromium oxide with a solution of organometallic cocatalyst. The reaction is produced immediately at room temperature and the product thus obtained can be used, without other treatment, for the polymerization of olefins. To obtain the best results, the catalytic composition is used immediately after its preparation.

The polymerization can be carried out in an inert solvent, preferably a hydrocarbon (see U.S. 2,825,721), at a relatively high temperature, between 120° and 200° C. and preferably between 135° and 170° C., under a pressure of about 10 to 40 kg. per sq. cm.

The polymerization according to the invention is applied to all olefins and particularly to ethylene, as well as to olefins containing 3 to 6 carbon atoms, as more fully described in U.S. 2,825,721. The process also permits the manufacture of copolymers of olefins and conjugated diolefins, for example, copolymers of ethylene-propylene, ethylene-1-butene, and ethylene-1-butene-butadiene.

As a basis of comparison with the process according to the invention, in the specific embodiments described in the following example, and to make clearer the advantages, a polymerization test is carried out in the presence of a conventional chromium oxide catalyst, used alone.

This catalyst is obtained by impregnating, with aqueous chromium trioxide solution, a silica-alumina support containing, per kg., 870 gm. silica and 130 gm. alumina. The catalyst obtained contains in the dry state 25 gm. chromium per kg. It is activated by heating in a current of dry air for about 15 hours at 560° C.

0.200 gm. of this catalyst and 450 gm. cyclohexane are introduced into a 1.5-liter autoclave of stainless steel, perfectly clean and dry and carefully purged with nitrogen. The catalyst is kept in suspension in the cyclohexane through energetic agitation. The temperature of the reactor is brought to about 140° C. Very pure ethylene is introduced up to a total effective pressure in the autoclave of 31.5 kg. per sq. cm. Then the ethylene is allowed to polymerize under this pressure which is kept constant by the continuous introduction of monomer, with the temperature held at 138° C.

After one-half hour, the polymerization is stopped by allowing the unreacted ethylene to escape. The polymer is dried in vacuo, weighed and examined.

Under the conditions described, 71 gm. polymer is obtained, whose melt index, measured according to the ASTM standard D 1238-52 T, is 0.90.

*Example I*

The operation is exactly as in the foregoing comparative run, but, to the catalyst suspension in the polymerization autoclave, 3 ml. of a solution of "Aluminium Isoprenyl" in cyclohexane is added. Thus a catalytic composition is obtained in which the atomic ratio of Al/Cr is 3/1.

The polymerization is carried out exactly as in the foregoing run. Thus 55 gm. polymer is obtained whose melt index is 0.17.

The use of "Aluminium Isoprenyl" as cocatalyst thus permits, at the same polymerization temperature, a very considerable rise of the molecular weight of the manufactured polyethylene, so that its melt index decreases from 0.90 to 0.17.

*Example II*

Under the conditions of Example I, 3 ml. of a solution in cyclohexane of the product obtained by the reaction of diborane with butadiene is added to the suspension of catalyst in the polymerization autoclave. This product has the following structure:

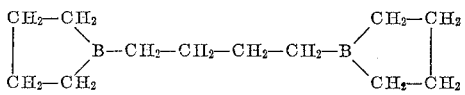

The catalytic composition obtained is characterized by a B/Cr atomic ratio of 7/1.

The polymerization carried out under the conditions of Example I furnishes 34 gm. polymer whose melt index is 0.20.

The utilization of this organoboron cocatalyst permits the rise of the molecular weight of the polyethylene whose melt index decreases from 0.90 to 0.20.

We claim:
1. In a process for the polymerization of olefins to solid polymers in the presence of a supported chromium oxide catalyst wherein at least part of the chromium is hexavalent at the initial contacting of said olefin with said catalyst, the improvement which comprises introducing into the reaction, as cocatalyst having the formula:

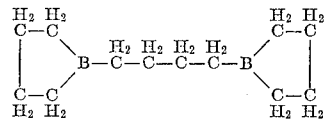

2. A catalyst comprising chromium oxide supported on at least one material selected from the group silica, alumina, zirconia and thoria, at least part of the chromium being hexavalent, and a cocatalyst having the formula

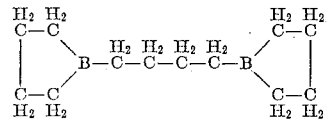

References Cited by the Examiner
UNITED STATES PATENTS 3,082,195   3/1963   Peters et al. _____ 260—94.9
3,109,838   11/1963  Chatt et al. _____ 260—93.7

FOREIGN PATENTS 1,222,575   1/1960   France.

JOSEPH L. SCHOFER, *Primary Examiner.*